(12) United States Patent
Houssaye et al.

(10) Patent No.: US 9,580,179 B2
(45) Date of Patent: Feb. 28, 2017

(54) AIR CONDITIONING SYSTEM FOR AN AIRCRAFT PASSENGER COMPARTMENT

(75) Inventors: Laurent Houssaye, Saint Faust (FR); Laurent Minel, Pau (FR)

(73) Assignee: TURBOMECA, Bordes (FR)

( * ) Notice: Subject to any disclaimer, the term of this patent is extended or adjusted under 35 U.S.C. 154(b) by 615 days.

(21) Appl. No.: 14/122,093

(22) PCT Filed: May 29, 2012

(86) PCT No.: PCT/FR2012/051196
§ 371 (c)(1),
(2), (4) Date: Nov. 25, 2013

(87) PCT Pub. No.: WO2012/164214
PCT Pub. Date: Dec. 6, 2012

(65) Prior Publication Data
US 2014/0124160 A1 May 8, 2014

(30) Foreign Application Priority Data

May 30, 2011 (FR) ...................... 11 54693

(51) Int. Cl.
*B60H 1/00* (2006.01)
*B60H 3/00* (2006.01)
(Continued)

(52) U.S. Cl.
CPC ............ *B64D 13/08* (2013.01); *B64D 13/06* (2013.01); *B64D 2013/0611* (2013.01); *B64D 2013/0655* (2013.01); *Y02T 50/56* (2013.01)

(58) Field of Classification Search
CPC B64D 13/08; B64D 13/06; B64D 2013/0614; B64D 2013/0611; B64D 2013/0655; Y02T 50/56

(Continued)

(56) References Cited

U.S. PATENT DOCUMENTS 2,851,254 A * 9/1958 Messinger ............. B64D 13/04
165/216
5,135,161 A 8/1992 Goodman
(Continued)

FOREIGN PATENT DOCUMENTS

EP 1 880 939 1/2008
FR 2 485 473 12/1981

OTHER PUBLICATIONS

International Search Report Issued Sep. 27, 2012 in PCT/FR12/051196 Filed May 29, 2012.

*Primary Examiner* — Len Tran
*Assistant Examiner* — Claire Rojohn, III
(74) *Attorney, Agent, or Firm* — Oblon, McClelland, Maier & Neustadt, L.L.P.

(57) ABSTRACT

An air conditioning system for an aircraft passenger compartment, the system including: an air supply circuit connecting at least one external air inlet to at least one air distribution outlet which opens into the compartment, an auxiliary power unit mounted in the supply circuit and configured to compress an air stream in the supply circuit, the supply circuit including a heating first branch that connects the auxiliary power unit to the air distribution outlet, and in which a heating mechanism is mounted, a cooling second branch that connects the auxiliary power unit to the air distribution outlet, and a switching mechanism configured to distribute the air stream between the heating first branch and the cooling second branch.

8 Claims, 2 Drawing Sheets

(51) Int. Cl.
*B64D 13/08* (2006.01)
*B64D 13/06* (2006.01)

(58) Field of Classification Search
USPC ...... 165/42, 44, 201, 202, 203, 248; 62/172, 62/238.2, 401
See application file for complete search history.

(56) References Cited

U.S. PATENT DOCUMENTS

| | | | | |
|---|---|---|---|---|
| 5,273,486 | A * | 12/1993 | Emmons | B64D 13/04 236/78 D |
| 5,516,330 | A * | 5/1996 | Dechow | B64D 13/08 165/235 |
| 6,544,114 | B2 * | 4/2003 | Buchholz | B64D 13/00 244/118.5 |
| 7,264,017 | B2 * | 9/2007 | Denike | B64D 13/02 137/495 |
| 7,462,098 | B2 * | 12/2008 | Arthurs | B64D 13/04 244/180 |
| 7,531,980 | B2 * | 5/2009 | McCoy | G05B 11/28 137/81.1 |
| 7,950,987 | B2 * | 5/2011 | McCoy | B64D 13/04 454/71 |
| 8,936,071 | B2 * | 1/2015 | Bruno | B64D 13/06 165/104.19 |
| 2002/0121103 | A1 * | 9/2002 | Udobot | B64D 13/06 62/402 |
| 2008/0032616 | A1 * | 2/2008 | Vogel | B64D 13/06 454/74 |

* cited by examiner

AIR CONDITIONING SYSTEM FOR AN AIRCRAFT PASSENGER COMPARTMENT

The present invention relates to the aeronautical field and more particularly to an air conditioning system for an aircraft passenger compartment.

In order to ensure the comfort of passengers on an aircraft, it is known and obligatory to ventilate the passenger compartment (also called the passenger cabin) by causing a flow of fresh air to circulate in the compartment. The fresh air for ventilation is taken from outside the aircraft and is fed by a supply circuit into the compartment. The temperature of the ventilation air flow is regulated so as to be able to keep the temperature of the compartment within limits capable of ensuring the comfort of passengers. Thus, if for the majority of the time it is necessary to cool the ventilation air flow in order to compensate for the heat generated by the passengers and the equipment present in the compartment (lighting, etc.), the fact remains that the ventilation air flow must be heated under certain conditions, in particular in cold weather, especially in the initial phase of heating the compartment.

The ventilation of the compartment represents an energy consumption which should be reduced as much as possible both in the course of the aircraft flight and when the aircraft is parked at a stand in an airport and its engines are shut down. In order to ventilate the aircraft compartment whilst the aircraft is parked, it is necessary to use an auxiliary power unit (APU) which is mounted on the aircraft and supplies power to the aircraft, thus enabling ventilation of the passenger compartment.

By way of example, with reference to FIG. 1 showing an air conditioning system according to the prior art, a compartment 1 in which passengers of the aircraft are situated is supplied by an air supply circuit having:

- an auxiliary power unit 4 supplying a pressurised air stream $F_{APU}$,
- an air conditioning pack 2 which receives the pressurised air stream $F_{APU}$ and regulates the temperature thereof, the air conditioning pack 2 preferably having a cooling unit for cooling the pressurised air stream $F_{APU}$,
- an air mixer 3 which receives a temperature-regulated air stream from the conditioning pack 2 and a recycled air stream from the compartment 1 in order to form a mixed air flow $F_M$ which supplies the compartment 1, and
- hot air injection valves 9 which enable fine adjustment of the thermal power injected into the various zones of the compartment 1 for local control of the temperature thereof, an air stream exiting from the compartment 1 after circulation thereof.

Conventionally, the auxiliary power unit 4 supplies an identical air stream $F_{APU}$ regardless of the mode of operation (heating or cooling of the compartment 1). This represents a drawback given that in order to supply a cool air stream effectively the air conditioning pack 2 ideally requires an air stream at high pressure whilst in order to supply a hot air stream the air conditioning pack 2 requires an air stream at moderate pressure.

In practice, the auxiliary power unit 4 merely supplies a high-pressure air stream $F_{APU}$ to the air conditioning pack 2 in all circumstances. Thus, when it is necessary to warm the compartment 1, the high-pressure air stream $F_{APU}$ is expanded in the air conditioning pack 2 in order to be injected into the compartment at the pressure of the compartment. In other words, a substantial portion of the air compressed by the auxiliary power unit 4 has been compressed at an excessive compression rate in relation to the minimum required in order for it to be used as hot source. The higher the compression rate, the higher the fuel consumption is. This excessive compression rate represents a superfluous expenditure of energy which this invention seeks to eliminate.

The invention seeks to optimise the use of the compressed air stream supplied by the auxiliary power unit 4 whilst limiting the energy cost linked to the heating of said air stream.

In order to eliminate at least some of these drawbacks, the invention relates to an air conditioning system for an aircraft passenger compartment, the system including:

- an air supply circuit connecting at least one external air inlet to at least one air distribution outlet capable of opening into the compartment,
- an auxiliary power unit mounted in said supply circuit and arranged so as to compress an air stream in the supply circuit,
- the supply circuit including:
- a heating first branch connecting the auxiliary power unit to the air distribution outlet in which means for heating the air stream are mounted,
- a cooling second branch connecting the auxiliary power unit to the air distribution outlet, and
- switching means adapted to distribute the air stream between the heating first branch and the cooling second branch.

The switching means advantageously make it possible to use the air stream compressed by the auxiliary power unit according to two different modes of operation which are optimised either for heating or for cooling. Furthermore, the heating means advantageously make it possible to provide calories to the air stream and thus to avoid an excessive energy consumption by the auxiliary power unit.

Advantageously, the contribution of calories makes it possible to diminish the compression rate of the auxiliary power unit and therefore its fuel consumption.

Preferably, the cooling second branch includes means for cooling the air stream of the supply circuit. The cooling means advantageously make it possible to provide cooling to the air stream and thus to increase the cooling power of the system in order for example to limit the drag of the aircraft, to improve the cooling of critical zones, to limit the dimensions and the mass of the auxiliary power unit, etc.

The cooling means are preferably presented in the form of a heat exchanger arranged so as to provide cooling to the air stream of the supply circuit by circulation of a cooling air stream. The cooling air stream is preferably an external air flow taken from outside the aircraft. Thus the air stream compressed by the auxiliary power unit is cooled externally without the provision of energy from the aircraft itself.

According to one aspect of the invention, the switching means are arranged so as to modify the point of operation of the auxiliary power unit during the heating. The switching means are advantageously activated during the heating in order to limit the power of the auxiliary power unit and thus to limit its fuel consumption. Any lack of compression results in a reduction of the temperature of the pressurised air stream which is advantageously compensated for by the provision of heat energy supplied by the heating means. In other words, the power unit is used optimally as a function of the objective (heating or cooling).

The heating means are preferably presented in the form of a heat exchanger arranged so as to provide calories to the air stream of the supply circuit by circulation of a heating air stream coming from the exhaust gas from the auxiliary power unit. The heat supplied by the auxiliary power unit is advantageously used in order to heat the compressed air stream.

According to one aspect of the invention, the cooling second branch including means for cooling the air stream of the supply circuit, the heating first branch is linked to the cooling second branch upstream of the cooling means in such a way as to make the heated air stream circulate in the cooling means. Such an architecture of the supply circuit has a low space requirement and can be easily integrated into a current aircraft.

The switching means are preferably arranged so as to inactivate the cooling means when a heated air stream circulates in the cooling means.

According to another aspect of the invention, the supply circuit which includes a mixer supplying the air distribution outlet, the heating first branch connecting the auxiliary power unit to the mixer, and the cooling second branch connecting the auxiliary power unit to the mixer, are separate. Thus, the compartment can be advantageously ventilated by managing the air streams of the heating and cooling branches independently.

Preferably, as the auxiliary power unit includes a low-pressure air outlet and a high-pressure air outlet, the heating first branch is connected to the low-pressure air outlet and the cooling second branch is connected to the high-pressure air outlet.

Thus, advantageously a low-pressure branch is provided which is advantageously adapted for heating and a high-pressure branch is provided which is adapted for cooling. The ventilation can be parameterised precisely and optimally according to the requirements.

More preferably, the supply circuit includes a diversion branch mounted in parallel with the heating first branch so as to be able to supply the mixer with a low-pressure air stream which is not heated by the heating means. Thus, the air stream coming from the auxiliary power unit may be advantageously diverted by heating means in order to supply the mixer with an unheated air stream, and thus the temperature of the air streams received by the mixer can be controlled in a fine manner.

The invention will be better understood when reading the following description given solely by way of example and with reference to the appended drawings, in which.

It should be noted that the drawings disclose the invention in a detailed manner in order to carry out the invention, and said drawings can of course serve to give a better definition of the invention where appropriate.

Figure 1:
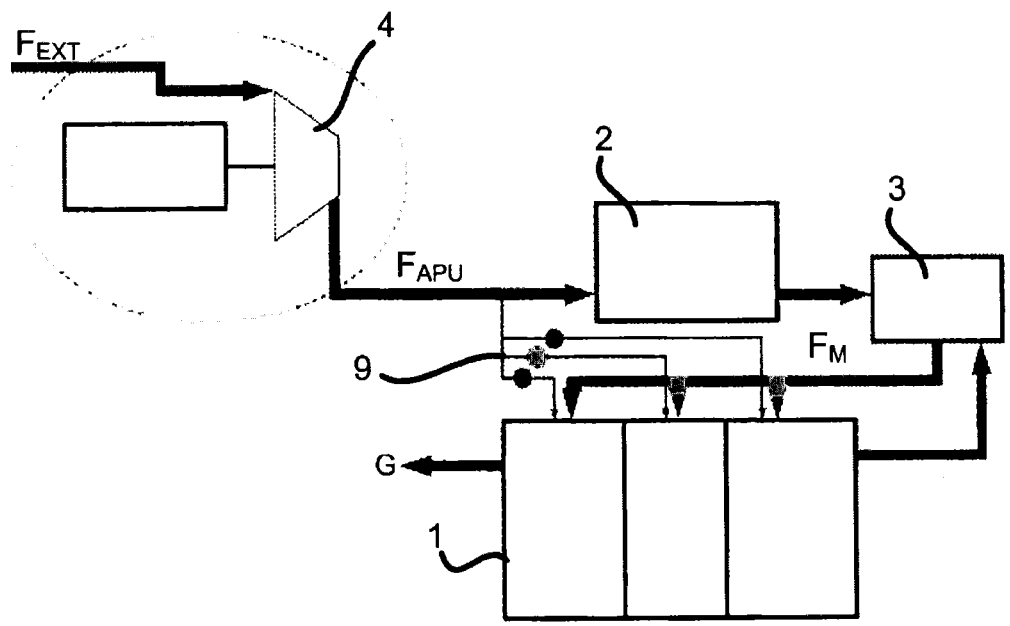
FIG. 1 shows a schematic representation of an air conditioning system according to the prior art.
Figure 2:
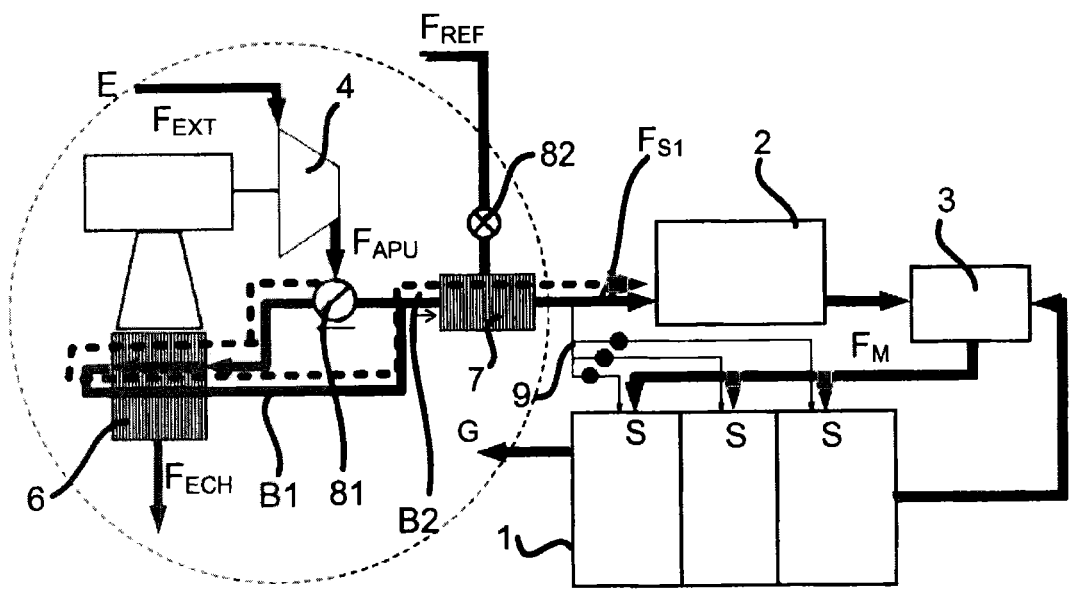
FIG. 2 shows a schematic representation of a first embodiment of an air conditioning system according to the invention during the heating of the passenger compartment.
Figure 3:
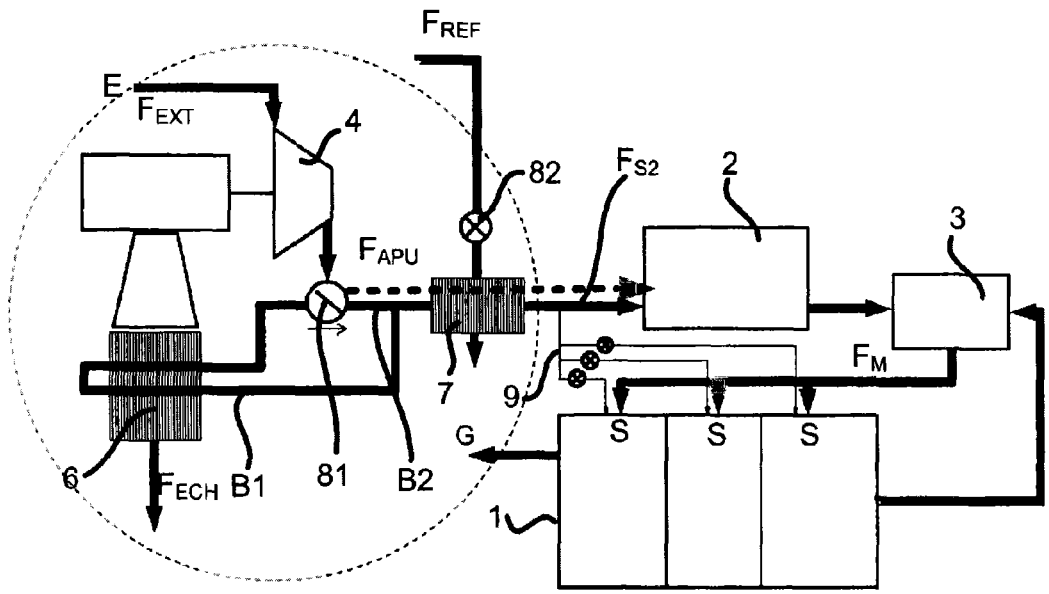
FIG. 3 shows a schematic representation of a first embodiment of FIG. 2 during the heating of the passenger compartment.
Figure 4:
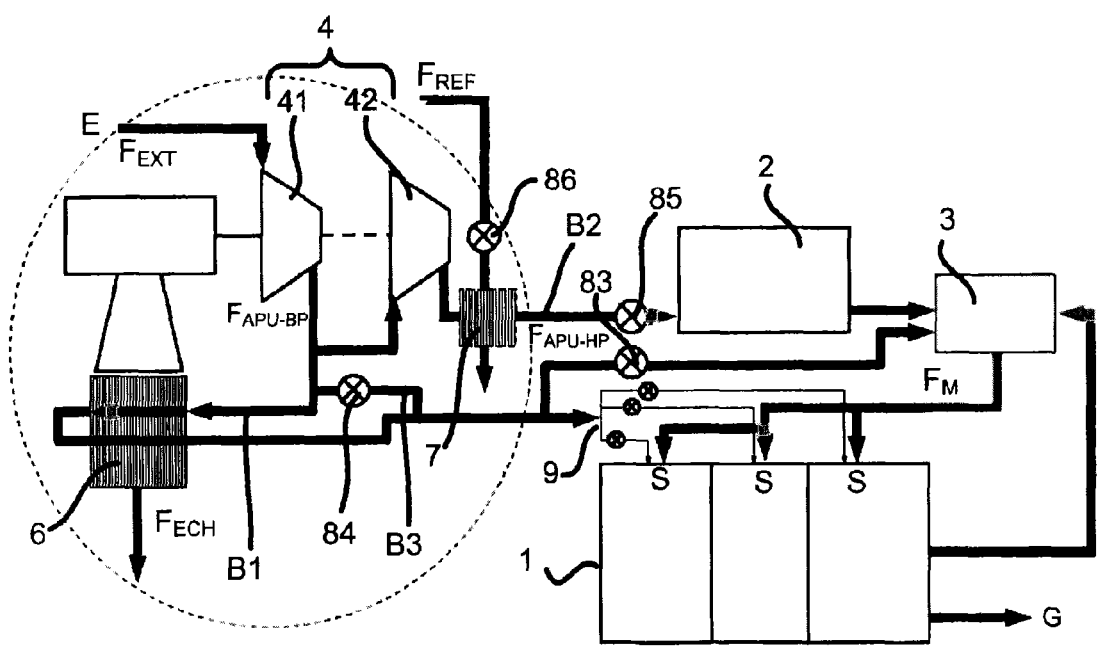
FIG. 4 shows a schematic representation of a second embodiment of an air conditioning system according to the invention.

By way of example, with reference to FIGS. 2 to 4 showing two embodiments of an air conditioning system according to the invention, the air conditioning system is arranged so as to ventilate a compartment 1 of an aircraft, in particular a compartment 1 in which the passengers on the aircraft are situated.

In this example the air conditioning system according to the invention includes an air supply circuit comprising an auxiliary power unit 4 which supplies a pressurised air stream, an air conditioning pack 2 which receives the pressurised air stream by regulating the temperature thereof and a mixer 3 which receives an air stream from the conditioning pack 2 and a recycled air stream from the compartment 1 in order to form a mixed air flow $F_M$ which supplies the compartment 1 as shown in FIG. 2. To this end, the supply circuit includes air distribution outputs S which open into the compartment 1. An outlet air stream G exits from the compartment 1 after circulation in this latter.

According to the invention, each supply circuit includes a heating first branch B1 which connects the auxiliary power unit 4 to the mixer 3 and in which heating means 6 are fitted, a cooling second branch B2 which connects the auxiliary power unit 4 to the mixer 3 and in which cooling means 7 are fitted, and switching means 81-86 which are adapted so as to distribute the air stream between the heating first branch B1 and the cooling second branch B2.

The switching means 81-86 make it possible to modify the operation of the supply circuit when this latter is to heat or cool the compartment 1. This modification of the supply circuit modifies the operating point of the auxiliary power unit 4, which limits the fuel consumption thereof. By virtue of the invention, the air conditioning system consumes less energy than in the prior art, the cooling or calories being provided by heating means 6 and cooling means 7 separate from the air conditioning pack 2.

In the two embodiments which will be presented below, the auxiliary power unit 4 (better known as the APU) includes a load compressor which makes it possible to compress the air flow taken from outside the aircraft in the region of the air inlet E of the supply circuit. The heating means 6 are presented in the form of a heat exchanger 6 arranged so as to provide calories to the air stream of the heating first branch B1 by circulation of a heating air stream $F_{ECH}$ coming from the exhaust gases from the auxiliary power unit 4, as shown in FIGS. 2 to 4. The heating means 6 are preferably mounted directly in the region of the exhaust of the auxiliary power unit 4 in order to benefit from the heat generated by the auxiliary power unit 4 in the course of operation thereof. Similarly, in the two embodiments the cooling means 7 are presented in the form of a heat exchanger 7 arranged so as to provide cooling to the air stream of the cooling second branch B2 by circulation of a cooling air stream $F_{REF}$ taken from outside the aircraft, as shown in FIGS. 2 to 4. Of course the heating means 6 or cooling means 7 could take various forms, the ideal being that the means 6, 7 are capable of providing calories and cooling obtained by recovery of energy and not by additional consumption.

1. First Embodiment

According to a first embodiment of the invention, with reference to FIGS. 2 and 3, the auxiliary power unit 4 receives an air stream $F_{EXT}$, taken from outside the aircraft in the region of the air inlet E, and compresses it in order to form a compressed air stream $F_{APU}$ which supplies the supply circuit.

The supply circuit includes switching means which, in this example, are presented in the form of a first valve 81 arranged so as to receive the compressed air stream $F_{APU}$ and to distribute it between the heating first branch B1 and the cooling second branch B2 and a second valve 82 arranged so as to modulate the flow rate of the cooling air stream $F_{REF}$ providing cooling to the compressed air stream $F_{APU}$ circulating in the cooling means 7 of the cooling second branch B2. Thus the second valve 82 makes it possible to regulate the degree of cooling of the cooling means 7.

In order to limit the space required and the complexity of the air conditioning system, the heating first branch B1 is connected to the cooling second branch B2 upstream of the cooling means 7 in such a way as to make the heated air stream circulate in the cooling means 7. Such an architecture of the supply circuit has a low space requirement and can be more easily integrated into a current aircraft. The terms "upstream" and "downstream" are defined relative to the circulation of the air stream from upstream to downstream in the supply circuit.

In this first embodiment, the air conditioning pack 2 includes two branches in parallel (not shown), of which one includes a cooling device and of which the other has no device, and a distribution valve arranged so as to distribute the air stream entering the air conditioning pack 2 between the two branches. During heating, the distribution valve of the air conditioning pack is controlled in order to guide the air stream towards the branch without a cooling device, the consequence of which is to reduce the pressure in the supply circuit substantially to the pressure of the passenger compartment 1. The auxiliary power unit 4 then modifies its operating point in order to work at a lower pressure and consume less fuel. The distribution valve of the air conditioning pack 2 belongs to the switching means of the conditioning system and advantageously makes it possible to modify the operating point of the compressor.

With reference to FIG. 2, the switching means 81, 82 are advantageously controllable in such a way that when the first valve 81 is open in order to guide the air stream, totally or partially, towards the heating first branch B1, the second valve 82 is then closed in order to prevent the circulation of a cooling air stream $F_{REF}$, taken from outside the aircraft, in the cooling means 7. The control command can be transmitted by any element of the conditioning system, in particular by the air conditioning pack 2. Thus, when a heating control command is transmitted to the air conditioning system, the compressed air stream $F_{APU}$ circulates successively in the heating means 6 of the heating first branch B1 and the cooling means 7 of the cooling second branch B2 but is not cooled given that the cooling air stream $F_{REF}$ is shut off by the second valve 82 (the circulation of the compressed air stream $F_{APU}$ is represented by dotted lines in FIG. 2). Thus the air conditioning pack 2 receives an outlet air stream $F_{S1}$, which is heated to the desired temperature and of which the pressure will become even lower as the need for heating fixed by the air conditioning pack 2 becomes greater.

This is advantageous from an energy point of view, the energy resources of the aircraft being preserved. In fact, the calories provided to the outlet air stream $F_{S1}$ have been recovered at the exhaust of the auxiliary power unit 4.

With reference to FIG. 3, in a similar manner, the switching means 81, 82 are advantageously controllable in such a way that when the first valve 81 is open, totally or partially, towards the cooling second branch B2, the second valve 82 is then opened in order to enable the circulation of a cooling air stream $F_{REF}$, taken from outside the aircraft, in the cooling means 7. Thus, when a cooling control command is transmitted to the air conditioning system, the compressed air stream $F_{APU}$ is preferably oriented in the cooling means 7 of the cooling second branch B2 so as to be cooled by the cooling air stream $F_{REF}$ (the circulation of the compressed air stream $F_{APU}$ is represented by dotted lines in FIG. 3). Thus the air conditioning pack 2 receives an outlet air stream $F_{S2}$ which is substantially precooled. When the ventilation air stream is distributed in the compartment 1 this air stream is thus cooled, on the one hand, by the cooling means 7 and, on the other hand, by the air conditioning pack 2. Overall, the cooling means 7 contribute to increasing the overall cooling power of the air conditioning system.

The surplus cooling power can be exploited according to various alternatives or combinations:
  reducing the compression work of the load compressor of the auxiliary power unit 4 (and therefore reducing the size, the mass, the bulk, the consumption of the auxiliary power unit 4 at ISO cooling performance),
  reducing the external cold air stream used by the air conditioning pack 2 as cold source and thus diminishing the drag induced on the aircraft in flight,
  increasing the cooling performance of the system in certain particularly critical cases of operation.

In this example, the load compressor of the auxiliary power unit 4 is a variable-setting centrifugal compressor, functioning at variable speed, capable of adapting its operating point as a function of the fixed flow rate/pressure conditions downstream of the auxiliary power unit 4. Of course the compressor could have various forms.

In a similar manner to the prior art, the supply circuit includes air injection valves 9 which enable fine adjustment of the thermal power injected into the various zones of the compartment 1 for local control of the temperature thereof. In this embodiment, the injection valves 9 are mounted in injection branches which start upstream of the air conditioning pack 2 and open into the compartment 1 in the region of the air distribution outlets S as shown in FIGS. 2 and 3.

The air conditioning system according to the first embodiment is advantageously compact and lightweight. Integration thereof in an existing aircraft is simple to implement. The heating branch B1 and the cooling branch B2, and also the switching means, are preferably assembled in the form of an independent thermal conditioning module which can be connected to the auxiliary power unit 4 before supplying the air conditioning pack 2.

2. Second Embodiment

According to a second embodiment of the invention, with reference to FIG. 4, the auxiliary power unit 4 receives an air stream $F_{EXT}$ taken from outside the aircraft and compresses it in order to form a compressed air stream which supplies the air conditioning system. In this second embodiment, the auxiliary power unit 4 is adapted to supply simultaneously on two discrete circuits (and not alternately on one single circuit) a low-pressure compressed hot air stream $F_{APU-BP}$, and a "cool", or more precisely "precooled", air stream compressed at high pressure $F_{APU-HP}$. In this example, the auxiliary power unit 4 is in the form of a compressor having a low-pressure stage 41 and a high-pressure stage 42 respectively supplying the hot low-pressure compressed air stream $F_{APU-BP}$ and the "cool" high-pressure air stream $F_{APU-HP}$. In this second embodiment, the air conditioning pack 2 only includes one single branch having a cooling device. The air conditioning pack 2 regulates the temperature injected into the compartment 1 by mitigating the low-pressure air stream $F_{APU-BP}$ and the high-pressure air stream $F_{APU-HP}$.

The supply circuit includes switching means in the form of a first low-pressure valve 83 arranged so as to receive the low-pressure compressed stream $F_{APU-BP}$ and to regulate the flow rate of hot air fed to the mixer 3 and a first high-pressure valve 85 arranged so as to receive the high-pressure compressed stream $F_{APU-HP}$ and to regulate the flow rate of cool air fed to the mixer 3.

As shown in FIG. 4, the supply circuit includes, between the low pressure stage of the compressor 41 and the first low-pressure valve 83, two supply branches in parallel: a heating branch B1 in which the heating means 6 and a diversion branch B3 without such heating means 6 are situated. The switching means also include a second low-pressure valve 84 making it possible to distribute the low-pressure compressed flow $F_{APU\text{-}BP}$ coming from the compressor of the auxiliary power unit 4 between the two branches B1, B3 and thus to control or limit the temperature of the low-pressure compressed stream $F_{APU\text{-}BP}$ received by the exchanger 3.

In a similar manner to the first embodiment, the switching means also include a second high-pressure valve 86 (identical to the second valve 82 of the first embodiment) arranged so as to limit flow rate of the cooling air stream $F_{REF}$, taken from outside the aircraft, which supplies the cooling means 7 of the second cooling branch B2.

The first low-pressure valve 83 and high-pressure valve 85 of the switching means make it possible for the air conditioning system respectively to regulate the flow rate of the low-pressure hot air stream $F_{APU\text{-}BP}$ and "cool" high-pressure stream $F_{APU\text{-}HP}$ received by the mixer 3, which makes it possible to ventilate the compartment 4 in an optimal manner, and to do so by limiting the consumption of energy.

The second low-pressure valve 84 and high-pressure valve 86 of the switching means make it possible respectively to regulate the provision of calories/cooling in the flow rates of the low-pressure air stream $F_{APU\text{-}BP}$ and high-pressure stream $F_{APU\text{-}HP}$ received by the mixer 3. The calories are advantageously recovered at the exhaust of the auxiliary power unit 4. The ventilation air temperature is perfectly controlled in the compartment 1.

In a similar manner to the first embodiment, the switching means 83-86 are advantageously controllable in such a way as to modify the operating point of the compressor of the auxiliary power unit 4 in such a way as to limit its consumption during the heating or the cooling.

The compressor of the auxiliary power unit 4 may comprise one or more shafts. The low-pressure stage is preferably dimensioned in order to be capable of supplying a sufficient pressure to supply the compartment 1 during the flight of the aircraft.

In a similar manner to the prior art, the supply circuit includes air injection valves 9 which enable fine adjustment of the thermal power injected into the various zones of the compartment 1 for local control of the temperature thereof. With reference to FIG. 4, the injection valves 9 are mounted in injection branches which start in the region of the heating branch B1 and the diversion branch B3 and open into the compartment 1 in the region of the air distribution outlets S of the compartment 1.

In a variant of the second embodiment, the air conditioning system includes two auxiliary power units in order to ensure a redundancy, each auxiliary power unit being capable of supplying the two hot and "cool" supply circuits.

An air conditioning system which makes it possible to provide a hot air stream and a cold air stream was presented previously, but of course the air conditioning system is capable of mitigating the hot and cold air streams.

Moreover, cooling means 7 are presented which are arranged so as to provide cooling to the air stream of the cooling second branch B2 by circulation of a cooling air stream $F_{REF}$ taken from outside the aircraft. Of course any other air stream could provide cooling. Preferably, the outlet air stream from the compartment G is used in the cooling means 7 for cooling the air stream of the cooling second branch B2.

According to one aspect of the invention, the outlet air stream from the compartment G is injected into a recovery turbine (not shown) in order to produce mechanical energy in one form or another (electrical, pneumatic, etc.). Preferably, the injection is carried out after circulation of the outlet air stream from the compartment G in the cooling means 7. Thus, the outlet air stream from the compartment G is heated and has a higher energy level during its injection, which is advantageous.

The invention claimed is:

1. An air conditioning system for an aircraft passenger compartment, the system comprising:
    an air supply circuit connecting an external air inlet to an air distribution outlet and configured to open into the compartment;
    an auxiliary power unit mounted in the air supply circuit and configured to compress an air stream in the air supply circuit;
    wherein the air supply circuit includes:
        a heating first branch connecting an outlet of the auxiliary power unit to the air distribution outlet in which means for heating the air stream are mounted,
        a cooling second branch connecting the outlet of the auxiliary power unit to the air distribution outlet including means for cooling the air stream of the supply circuit, and
        switching means configured to distribute the air stream between the heating first branch and the cooling second branch.

2. A system according to claim 1, wherein the means for cooling includes a heat exchanger configured to provide cooling to the air stream of the air supply circuit by circulation of a cooling air stream.

3. A system according to claim 1, wherein the switching means is configured to modify a point of operation of the auxiliary power unit during a heating.

4. A system according to claimed 1, wherein the means for heating includes a heat exchanger configured to provide calories to an air stream of the air supply circuit by circulation of a heating air stream coming from exhaust gases from the auxiliary power unit.

5. A system according to claim 1, wherein the heating first branch is connected to the cooling second branch upstream of the means for cooling to make the heated air stream circulate in the means for cooling.

6. A system according to claim 1, wherein the air supply circuit includes a mixer supplying the air distribution outlet, and the heating first branch connecting the auxiliary power unit to the mixer and the cooling second branch connecting the auxiliary power unit to the mixer are separate.

7. A system according to claim 6, wherein the auxiliary power unit includes a low-pressure air outlet and a high-pressure air outlet, the heating first branch is connected to the low-pressure air outlet and the cooling second branch is connected to the high-pressure air outlet.

8. A system according to claim 6, wherein the air supply circuit includes a diversion branch mounted in parallel with the heating first branch to be configured to supply the mixer wit h a low-pressure air stream that is not heated by the means for heating.

* * * * *